(12) United States Patent
Lamb et al.

(10) Patent No.: US 12,226,928 B2
(45) Date of Patent: Feb. 18, 2025

(54) DEDUSTING OF WOOD BOARDS BY USE OF TWO COUNTER-ROTATING PAIRS OF BRUSHES WITH A VACUUM SYSTEM

(71) Applicant: Automated Industrial Technologies, Inc., Forest, VA (US)

(72) Inventors: Charles D. Lamb, Forest, VA (US); Zachary Adams, Forest, VA (US)

(73) Assignee: Automated Industrial Technologies, Inc., Forest, VA (US)

( * ) Notice: Subject to any disclaimer, the term of this patent is extended or adjusted under 35 U.S.C. 154(b) by 0 days.

(21) Appl. No.: 18/368,934

(22) Filed: Sep. 15, 2023

(65) Prior Publication Data

US 2024/0001582 A1    Jan. 4, 2024

Related U.S. Application Data

(62) Division of application No. 17/001,760, filed on Aug. 25, 2020, now Pat. No. 11,801,614.

(60) Provisional application No. 62/891,465, filed on Aug. 26, 2019.

(51) Int. Cl.
| | |
|---|---|
| *B27G 3/00* | (2006.01) |
| *B08B 1/12* | (2024.01) |
| *B08B 1/20* | (2024.01) |
| *B08B 5/04* | (2006.01) |
| *B65G 45/18* | (2006.01) |

(52) U.S. Cl.
CPC .................. *B27G 3/00* (2013.01); *B08B 1/12* (2024.01); *B08B 1/20* (2024.01); *B08B 5/043* (2013.01); *B65G 45/18* (2013.01); *B08B 2215/006* (2013.01); *B65G 2201/0282* (2013.01)

(58) Field of Classification Search
CPC .. B08B 1/12; B08B 5/043; B08B 1/20; B08B 2215/006; B27G 3/00; B65G 45/18; B65G 2201/0282
See application file for complete search history.

(56) References Cited

U.S. PATENT DOCUMENTS

2008/0189902 A1    8/2008  Bae
2017/0087612 A1*   3/2017  Berendes ................ B08B 5/043

OTHER PUBLICATIONS

Morgan Board Deduster Brochure; undated; 1 page.
Baker M6 Board Deduster, product brochure dated Nov. 19, 2007; 2 pages.
Baker M4 Board Deduster, product manual; undated; 10 pages.
Go Fast D3 Deduster Brochure; undated; 2 pages.

* cited by examiner

*Primary Examiner* — Andrew A Horton
(74) *Attorney, Agent, or Firm* — Breiner & Breiner, L.L.C.

(57) ABSTRACT

A deduster is comprised of two sets (pairs) of counter-rotating dedusting brushes in cooperation with a vacuum system for saw dust removal from wooden lumber. In addition to these features, the deduster may feature a separate, movable, top brush assembly that can be easily adjusted for different board thicknesses and raised up to allow for clearing board jams and for pass-through if boards were to be run without dedusting. This deduster apparatus is modular, thereby allowing it to be positioned over an existing machine or a lumber board unscrambler machine such as a lugged unscrambler machine. There is also a deduster for a board handling hopper.

11 Claims, 10 Drawing Sheets

DEDUSTING OF WOOD BOARDS BY USE OF TWO COUNTER-ROTATING PAIRS OF BRUSHES WITH A VACUUM SYSTEM

RELATED APPLICATIONS

This application is a division of U.S. application Ser. No. 17/001,760, filed Aug. 25, 2020, entitled "Dedusting Of Wood Boards By Use Of Two Counter-Rotating Pairs of Brushes With A Vacuum System," which claims benefit of U.S. Provisional Application Ser. No. 62/891,465, filed Aug. 26, 2019, entitled "Dedusting Wood Boards By Use Of Two Counter-Rotating Pairs of Brushes With A Vacuum System," and which applications are incorporated herein by reference in their entireties.

FIELD OF THE INVENTION

The present invention is a deduster apparatus with improved dedusting performance and increased quantities of processed wood boards. Counter-rotating deduster brushes are combined for use with a vacuum system to efficiently handle the nuisance and processing problem of excess dust sticking to processed boards.

BACKGROUND OF THE INVENTION

The lumber processing industry utilizes various types of machinery to trim, grind, and perform cutting operations on lumber. This enables processing of wood from a freshly cut tree into dimensional lumber and pulverized wood chips. As a result of multiple operations being performed on wood as it passes through the wood processing system, sawdust and wood chips are produced. Although each cutting, trimming, and grinding machine is commonly equipped with some type of a vacuum dust removal system, sawdust and wood chips will inevitably adhere to the wood during and after the operation is performed. It is therefore necessary to remove the sawdust and chips from the wood to ensure it is presented clean for the next operation and for material reclaiming.

There currently exist several methods and machines to accomplish the task of "de-dusting" processed lumber. Of the methods in existence, the common ways in which de-dusting is accomplished is by use of rotating brushes above and below the boards, high-powered air blowers, and high-powered vacuum systems. The first method of dedusting involves powered, rotating brushes mounted above and below the pass-through line which the incoming boards follow. These brushes rotate and attempt to clean off any sawdust, wood chips, or residual fragments left from the cutting or grinding operations from off the top and bottom surface of the board. See FIG. 1 for one example of the upper and lower brush dedusting setup. FIG. 2 shows another example of a different setup of rotating brushes above and below the boards. And FIG. 3 illustrates a further example of alternative rotating brushes above and below the board to be dedusted.

FIG. 1 illustrates a prior art system 10 that includes rotating brushes 12 and 14 positioned above and below a conveyor 16 that carries undusted boards 20 between the brushes. The conveyor direction 18, in this example, is shown from left to right so that undusted boards 20 are dedusted and clean boards 22 move out from between the brushes 12 and 14. Brush 12 moves in a clockwise rotation 13 and brush 14 moves in a counterclockwise rotation 15. Depending on a particular conveyor system and how it retains and moves the boards along the conveyor, the rotation of the brushes may vary. Also, the boards 20 and 22 are moved along the conveyor 16 so that their longest edge is the leading edge into the brushes, or stated alternatively, the longest edges of the boards is perpendicular to the machine direction 18 of the conveyor.

FIG. 2 illustrates another prior art deduster system 30 that includes rotating brushes 32 and 34 above and below an undusted board 41. The undusted board 41 is retained and moved along between the rotating brushes 32 and 34 by driving rollers 36 that moves the undusted board 41 in the machine direction 38 and results in the dusted board 40. The top brush 32 rotates in the clockwise direction 33, while the bottom or lower brush 34 rotates in a counter-clockwise direction 35. As before, the brushes 32 and 34 may alternatively rotate in other directions and combinations of directions. In this system 30, the boards 41 are passed between the brushes 32 and 34 in a lengthwise manner where the longest edge of the board 41 is parallel to the machine direction 38 movement of the board.

FIG. 3 illustrates a further prior art deduster system 50 that includes rotating brushes 52 and 54. An undusted board 61 is retained in and moved forward by driving rollers 56 in machine direction 58. Brushes 52 and 54 rotate in directions 53 and 55 respectively. The result is a dusted board 60. In this system 50, the boards 61 are passed between the brushes 52 and 54 in a lengthwise manner where the longest edge of the board 61 is parallel to the machine direction 58 movement of the board.

The second dedusting method commonly employed is the use of an air moving apparatus such as a high-powered air blower which tries to dislodge all the sawdust and wood fragments off the boards as they pass through a tunnel or chamber. The chips and sawdust that are blown off the boards are removed by way of a vacuum system.

The last system that is commonly used for dedusting is a high-powered vacuum system. This system involves running the boards through a chamber in which is a high vacuum. This vacuum strives to strip the boards of any sawdust, woodchips, and other debris to present the board clean and ready for the next step in the process. Some of the currently used methods employ combinations of these aspects of dust and debris removal. These methods frequently employ the use of the round dusting brushes above and below the wood pass-through line, coupled with a blower and/or vacuum system to remove the sawdust that has been brushed off the wood.

The currently existing dedusting products on the market contain a variety of quantities of brushes, brushes of different designs, and different methods by which boards are fed into the brushing region. Some brush designs are as shown in FIG. 1, roller brushes, and some are as shown in FIG. 3, rotating brush pads. The majority of existing dedusting machines use roller, round, brushes as shown in FIG. 2 and require boards to be fed into the dedusting machine in an orientation with the longest side of the board parallel with the direction of travel of the board. This limits the board output quantity of a deduster as a result of relating the deduster board processing speed directly to the length of the board. As the board length increases, the deduster has contact with the board for a longer amount of time and the more time it takes for a board to pass completely through the deduster machine. This increases the potential for the dedusting machine to become the process bottleneck.

SUMMARY OF THE INVENTION

Accordingly, it is an object of the present invention to overcome the shortcomings of existing deduster systems.

The deduster apparatus and method described herein includes the use of counter-rotating, adjustable pairs of brushes to remove sawdust, woodchips, and other debris from wooden boards on which a cutting, grinding, sanding, or other material removal operation has been performed.

In one example, a board processing deduster apparatus comprises a board conveyor comprising a static frame supporting a moving conveyor belt adapted to carry boards in a machine direction wherein a longest edge of a board is adapted to be positioned on the conveyor belt in a substantially perpendicular orientation to the machine direction. The board conveyor belt has a top side on which boards are adapted to be carried and a bottom side of the board conveyor belt. The apparatus includes two pairs of rotating brushes including a first pair of rotating brushes adjacent the top side of the board conveyor belt and a second pair of rotating brushes adjacent the bottom side of the board conveyor belt opposite the first pair of rotating brushes, wherein the first pair of rotating brushes and the second pair of rotating brushes each rotate on an axis parallel to the longest edge of a board on the conveyor. The first pair of rotating brushes counter rotate so that a leading edge of the brushes that come in contact with a board on the board conveyor belt sweep toward each other and upwardly in the middle of the first pair of rotating brushes, and the second pair of rotating brushes counter rotate so that a leading edge of the brushes that come in contact with a board on the board conveyor belt sweep toward each other and downwardly in the middle of the second pair of rotating brushes. The first pair of rotating brushes each have a cross-sectional diameter, and the diameter of the two brushes may be substantially the same. The second pair of rotating brushes each have a cross-sectional diameter, and the diameter of the two brushes may be substantially the same. The first pair of rotating brushes and the second pair of rotating brushes may be positioned substantially directly across from each other on opposite sides of the conveyor belt or the bottom pair of brushes may be positioned either before or after the top set of brushes. The top and bottom sets of brushes do not need to be vertically aligned with each other. The apparatus may further comprise a plurality of vacuum ports positioned around the board conveyor belt, and wherein at least one vacuum port is above the top side of the board conveyor belt and at least one vacuum port is below the bottom side of the board conveyor belt, or a plurality of vacuum ports positioned around the board conveyor belt, and wherein a plurality of vacuum ports is above the top side of the board conveyor belt and a plurality of vacuum ports is below the bottom side of the board conveyor belt, or still further a plurality of vacuum ports positioned around the two pairs of rotating brushes, and wherein a plurality of vacuum ports is above the top side of the pair of rotating brushes and a plurality of vacuum ports is below the bottom side of the pairs of rotating brushes, or even further a plurality of vacuum ports positioned around the two pairs of rotating brushes and wherein a plurality of vacuum ports is centered above the intersection of the pair of the top rotating brushes and a plurality of vacuum ports is centered below the intersection of the pair of the bottom rotating brushes. The apparatus may further comprise a pivot arm connected to the frame, wherein the pivot arm is also connected to the first pair of rotating brushes, and the pivot arm is adapted to pivot up and down and make the first pair of rotating brushes of an adjustable height over the top side of the board conveyor belt.

In another example, a dedusting apparatus for a board handling hopper comprises at least two opposite support walls that form a V-shape and that are adapted to receive and support boards. At least one of the support walls is formed of a plurality of flat panels wherein the flat panels are positioned so that there is a gap between adjacent panels. A vacuum port is in direct connection with the gaps between the panels of the hopper support walls, whereby wood dust can be vacuumed from under boards that are deposited in the hopper for processing.

DETAILED DESCRIPTION OF THE PREFERRED EMBODIMENTS

Figure 1:
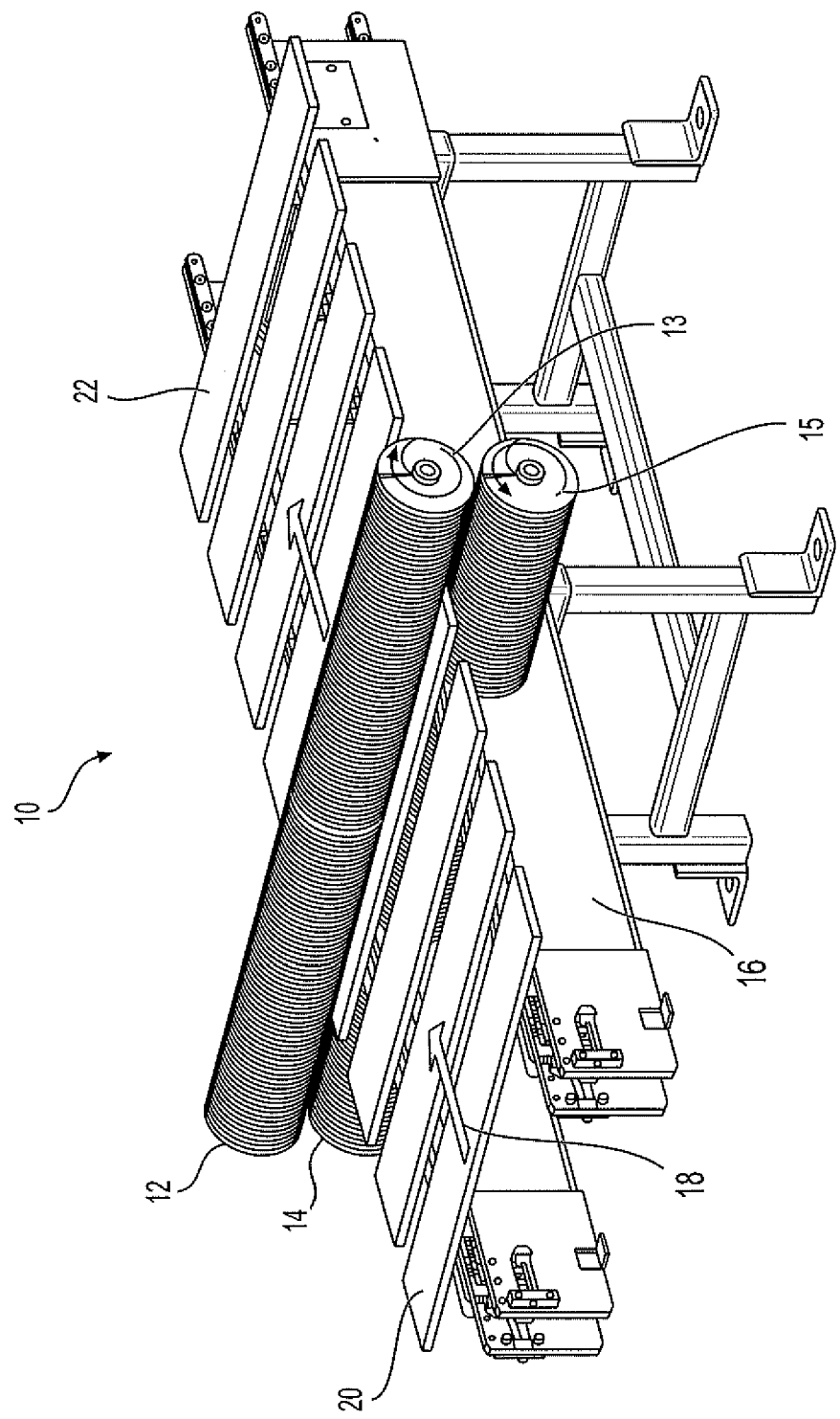
FIG. 1 is a perspective view of one example of a prior art deduster.
Figure 2:
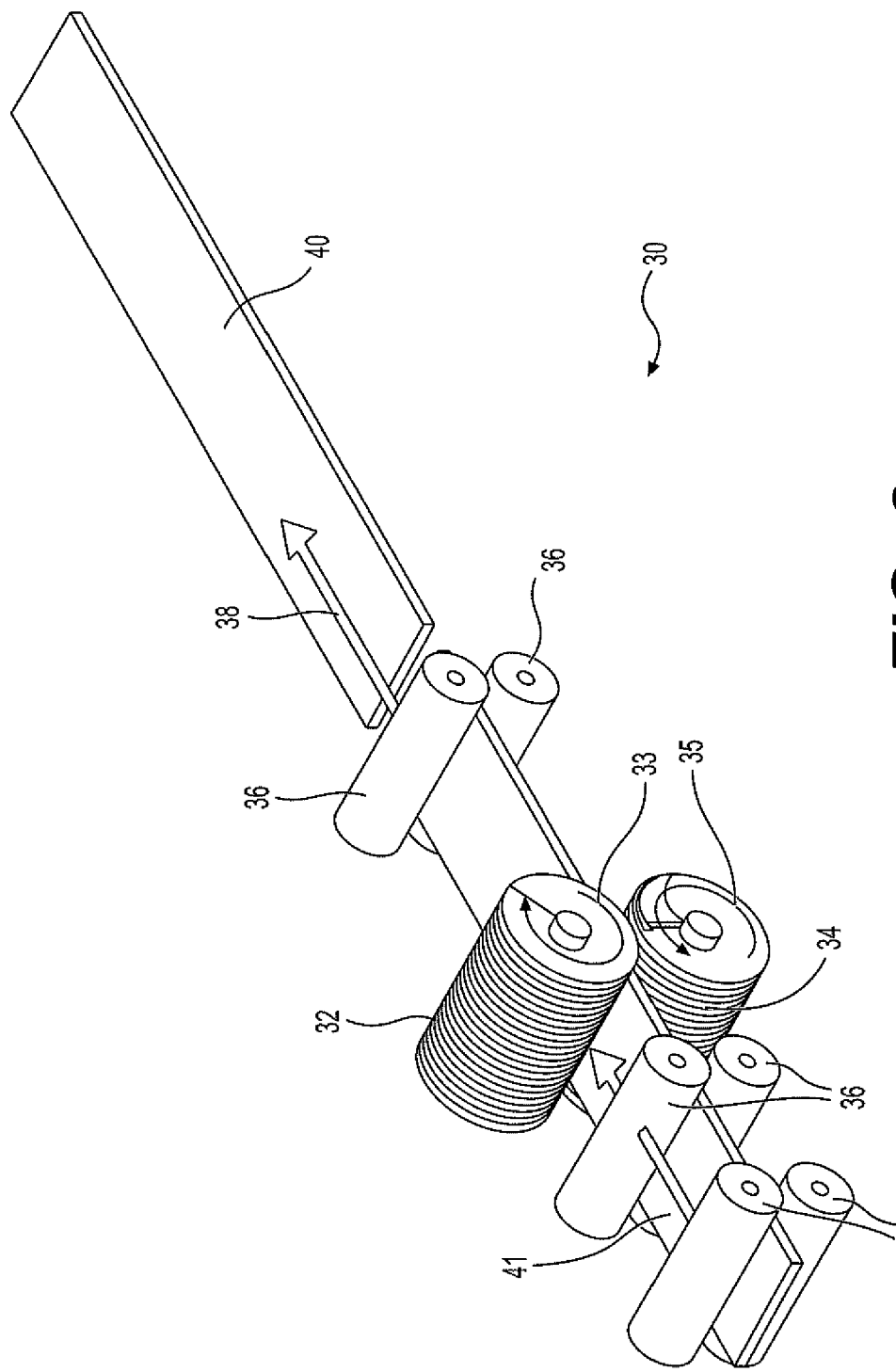
FIG. 2 is a perspective view of a second example of a prior art deduster.
Figure 3:
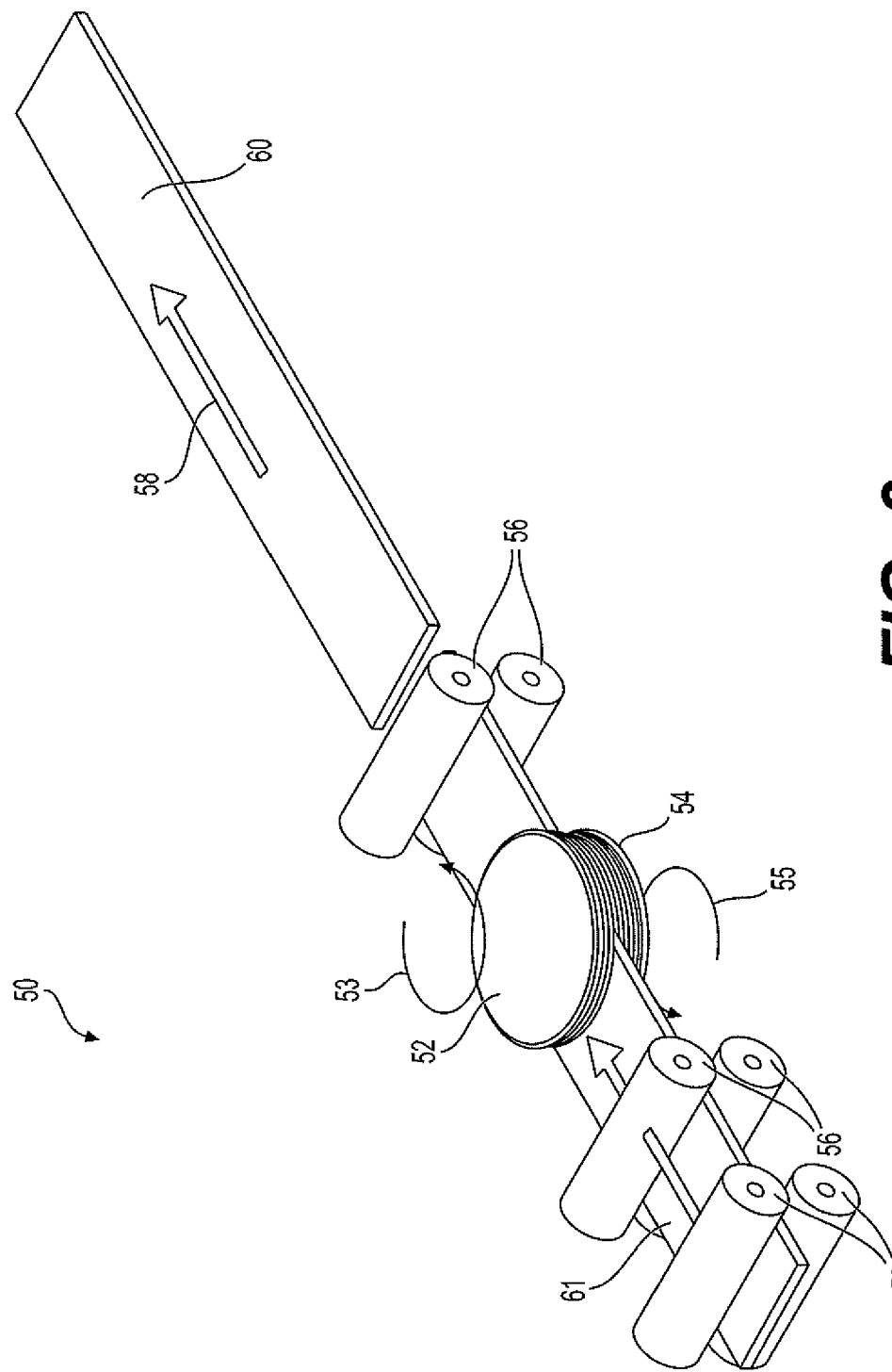
FIG. 3 is a perspective view of a third example of a prior art deduster.

In one example, the invention of a deduster as described herein is comprised of two sets (pairs) of counter-rotating dedusting brushes in co-operation with a vacuum system for saw dust removal from wooden lumber. In addition to these features, the deduster may feature a separate, movable, top brush assembly that can be easily adjusted for different board thicknesses and raised up to allow for clearing board jams and for pass-through if boards were to be run without dedusting. This deduster apparatus is modular, thereby allowing it to be positioned over an existing machine or a lumber board unscrambler machine such as a lugged unscrambler machine.

The deduster machine described herein contains several unique design aspects: a multi-port dust vacuum system used in conjunction with pairs of independently-driven counter-rotating brushes above and below the board path that rotate along an axis parallel to the longest edge of the board and height adjustable brushes to change penetration depth of the brush bristles into the wood. These design aspects can be implemented with a lugged chain or belt, such as the type used on a common conveyor or unscrambler machine for efficient board cleaning.

The present deduster may also contain a multi-port dust-removal vacuum system to ensure all dust is removed as lumber is being passed through the deduster machine. This is accomplished by vacuum ports positioned in the deduster hopper as well as vacuum ports above and below the rotating brush section. For instance, 6" vacuum conduit ports may be used, although any size can be used to accommodate the appropriate suction. For illustrative purposes, five ports may be positioned above the brushes (although this number can be increased or decreased as a result of how much suction force and suction volume is needed), three are positioned below (this can be increased or decreased following the previous reasoning), and two ports are positioned under the hopper at the front of the deduster to remove sawdust as wood is placed into the hopper (this number can also be increased or decreased depending on the desired suction force). As boards are placed in the hopper, some of the sawdust may fall into the bowl of the hopper and slide under the hopper through slits in each side of a raised boss on which the boards rest. This guides the sawdust into a collection region where the connected vacuum removes this dust. The use of vacuum ports and suction on a dust collection machine is not unique, but the use of vacuum in the hopper of the dust collecting machine is nowhere known. This enables the loose dust on the wood that falls off, to be collected before the wood enters the rotating brushes and prevents it from accumulating in the bottom of the hopper. If too much of the saw dust accumulated in the hopper it would be dragged into the brushes or prevent the boards from being picked up by the conveyor. A buildup of dust In the bottom of the hopper would require stopping the processing line and manually cleaning the hopper before continuing operation.

The deduster method and system described herein feature four counter-rotating roller brushes which rotate about an axis parallel to the longest edge of the board, and perpendicular to the board flow, positioned over a lugged unscrambler machine. Wooden boards run through the deduster will have a significantly shorter width in comparison to the length. This maximizes the amount of brush bristle contact and ensures that the brushes contact the boards for as short of a time as possible increasing board processing quantities. With the deduster, the lumber processing line can be run as fast as needed with the speed independent of the board length. The board width would play an insignificant role in the processing speed of the line due to it being significantly shorter than the longest edge of the board. The brushes rotate in a specially designed arrangement to cause a "suction" force on the board to aid in the vacuuming of the sawdust. As the board enters the brushes, it is pulled inward by the rotation of the brushes but held back as the lugs of the conveyor chain force the board back against the pulling force induced by the brush rotation. This holds the board securely as it passes between the pinching top and bottom brushes. As the board passes through the zone between the two sets of pinching brushes, the vacuum system sucks off the sawdust that is being brushed off the board. As the board continues and enters the second set of brushes, the brushes push the board back against the conveyor lugs and the conveyor tugs continue forcing the board through the brushes. This holds the board steady as it is dusted.

Brushes are used with vacuum and/or air knifes to improve the effectiveness of the dust removal process. Not all of the dust particles are loose on the surface of the boards. The dust particles do stick to the surface of the boards due to moisture, wood sap (i.e. pine sap or pitch) and mechanical "fingers" on both surfaces (i.e. hooks and/or loops like Velcro®). The sticking particles do require mechanical intervention to dislodge them. Depending on the species of the wood and environmental conditions, the construction of the brushes can be tailored for specific applications or generalized for a range of product. Because the mechanical loosening of the dust requires contact with the ends of the bristles of the brush, the rotational speed of the brush, the height of the brush above the conveying means and the linear speed of the board surface past the brush are important variables that must be controlled.

The rotating brushes of the deduster may be designed to allow adjustment of the "pinch" distance between the brushes above and below the board pass-through line. This is accomplished by pivoting the top brush mounting frame about a pivot shaft. This allows the top brushes penetration to be adjusted to maximize dust removal. A linear guide frame and lifting mechanism also allows the bottom brushes to be adjusted or lowered to clear the boards if the deduster machine must be serviced. A preset-adjustable height for both the top and bottom brushes also ensures that different widths and thicknesses of boards can be used as well as different diameter brushes close to the original brush diameter.

Figure 4:
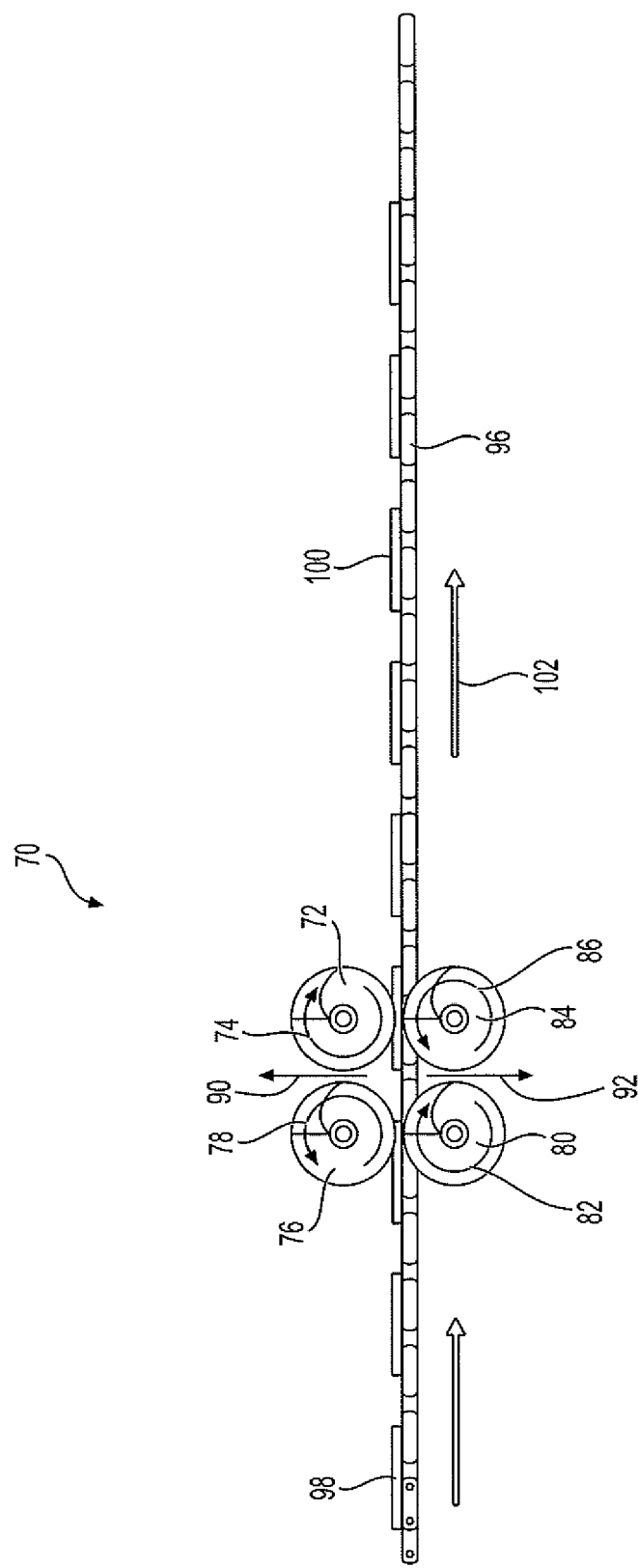
FIG. 4 is a side view showing a conveyor and two pair of counter-rotating brushes as described herein.

The rotating brushes of a deduster may be positioned at a lateral distance from each other, in the machine direction, depending on the size of the brushes and the intended upward/downward suction force needed to evacuate wood chips and sawdust. For example, the brushes may be spaced apart so that the brush rotation does not overlap in the adjacent brushes. This forms a gap between the brushes. In FIG. 4, the top side counter-rotating brushes 72 and 76 and the bottom side counter-rotating brushes 80 and 84 each have lateral gaps between the respective circles of rotation of those brushes. In FIG. 4, the suction force arrows 90 and 92 respectively are shown in those gaps. Alternatively, in FIG. 5, the top counter-rotating brushes 132 and 134 and bottom counter-rotating brushes 136 and 138 are shown with a small overlap in their respective circles of rotation.

The deduster is designed with a quick-change brush system which allows the dusting brushes to be changed in a short time in the case of brush wear or the need for a different design of brush. This is accomplished by use of rigid couplings, or a securing method by which the brushes can be disconnected completely from the drive shafts and removed. In addition to the quick-disconnect couplings used with the dedusting brushes, the top frame of the deduster which contains the top two brushes can be tilted back on pivots to access the brushes. This tilting top frame of the deduster is balanced between the weight of the brushes and driving apparatus and two counterweights which are positioned on the end of a pivot arm opposite the brushes. The bottom brush mechanism which contains the two bottom brushes can also be lowered down far enough to access or change them. The commonly used, prior art designs of deduster have a fixed frame that houses the brushes, and do not have a quick-disconnect method to remove the brushes. This makes brush changing and replacement a time-consuming and complicated process.

Turning now to the drawings, FIG. 4 illustrates a side view of a counter-rotating brush system 70. There is a conveyor 96 that carries undusted boards 98 and dusted boards 100 in a machine direction 102. The undusted boards 98 are carried between a pair of top brushes 72 and 76 and bottom brushes 80 and 84. The top brushes 72 and 76 rotate in the clockwise direction 74 and counter-clockwise direction 78 respectively. The top brushes 72 and 76 counter-rotate so that sawdust and wood chips are swept to the middle between the brushes and then upwardly as shown by arrow 90. This counter-rotation of the brushes 72 and 76 results in a suction force that moves the debris upwardly in direction 90. The bottom brushes 80 and 84 rotate in directions 82 and 86. Brush 80 rotates in a clockwise direction 82 while brush 84 rotates in counter-clockwise direction 86. Similar to the rotation of top brushes 72 and 76, the counter-rotation of bottom brushes 80 and 86 sweeps sawdust and chips to the middle between the bottom brushes and then downwardly in direction of arrow 92. The sweep to the middle creates a suction force in direction 92. The size and brush type of the respective top and bottom brushes may vary depending on the conveyor engineering and the type of wood product and how it was previously processed. Also, the height of the brushes above is adjustable based on specific processing parameters, including for instance board size, and based on the wear on the brushes that inevitably wear down over use. Finally, the speed or revolutions per minute of the brushes may be varied, again based on specific process conditions.

Figure 5:
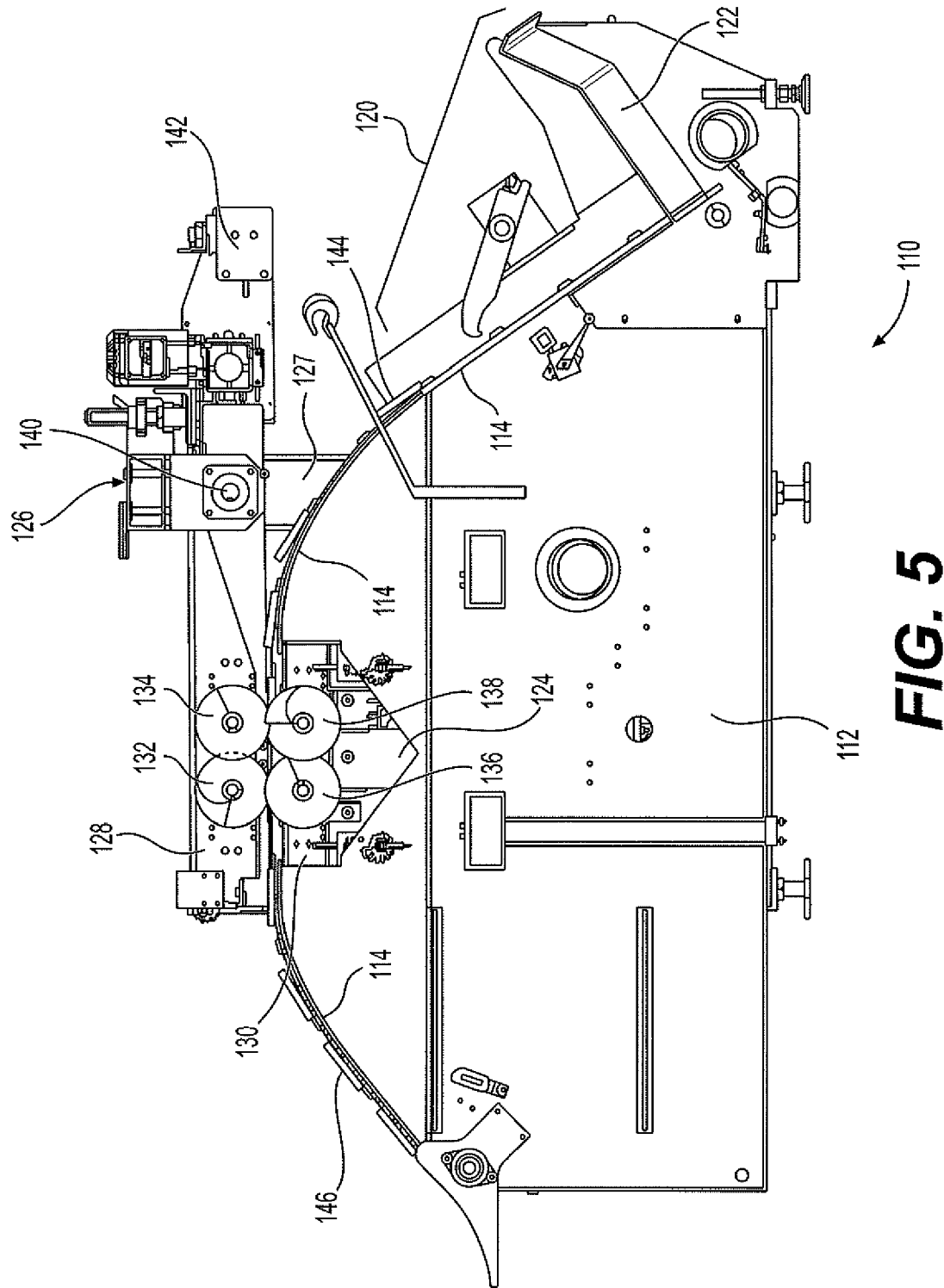
FIG. 5 is a side view of a deduster apparatus as described herein with the pivot arm in the down position.
Figure 6:
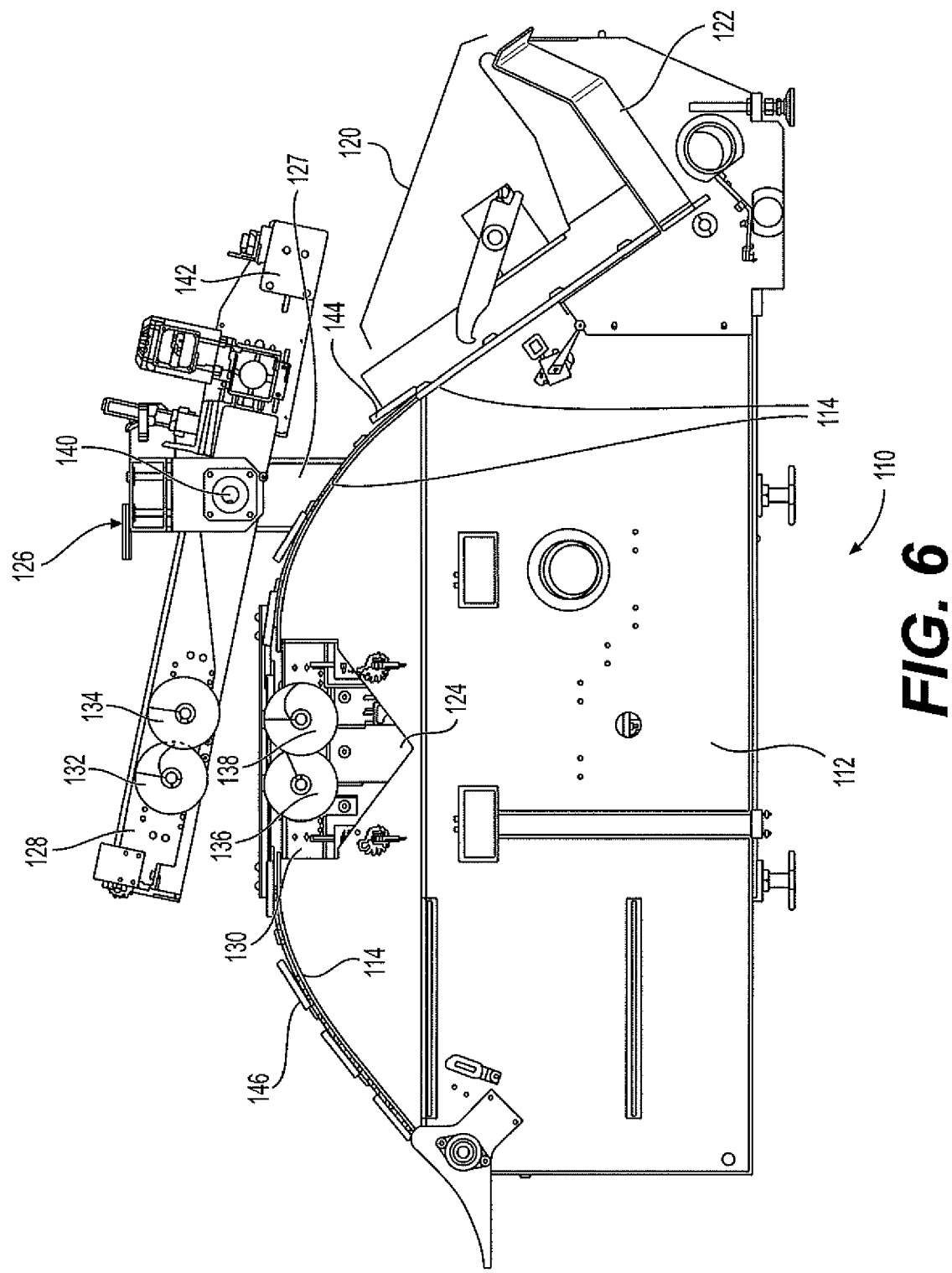
FIG. 6 is a side view of a deduster apparatus as described herein with the pivot arm in the up position.

FIGS. 5 and 6 illustrate a near complete view of a deduster system 110 with the vacuum port apparatus removed for clarity of view of the counter-rotating brushes. The deduster system 110 has a stationary frame 112 onto which a conveyor 114 is show, in this example moving in a machine direction from right to left. Beginning on the right side of the deduster system 110, there is a board unscrambler 120 that includes a hopper 122 where loose boards are placed. The unscrambler includes the beginning of the conveyor 114. Undusted boards 144 are carried by the conveyor 114 out from the unscrambler 120 and to the top of the system 110 where there are counter-rotating pairs of brushes 132, 134, 136, and 138 that operate as described in FIG. 4. The undusted boards 144 are brushed and then leave the brushes 132, 134, 136, and 138 as dusted boards 146 ready for further handling and processing.

Still in FIGS. 5 and 6, the bottom brushes 136 and 138 are adjustable in the vertical direction in the frame 112 to a conveyor support 130. There is adjustment to move and vary the height of the bottom brushes 136 and 138 relative to the plane of the board conveyor. Also, the bottom rotating brushes are supported by a raising or lowering mechanism 124 such as scissor jacks and can be lowered down to facilitate brush change or replacement. Other raising and lowering mechanisms, including manual or powered mechanisms, may be adapted for use for this raising or lowering purpose. The top brushes 132 and 134 are mounted onto a pivoting apparatus 126. The pivoting apparatus includes a rigid support post 127 that fixes the pivoting system 126 to the frame 112. A pivot arm 128 is connected by a pivot shaft 140 to the support post 127. On a first end of the pivot arm 128 there are positioned the top counter-rotating brushes 132 and 134. On the opposite end of the pivot arm 128 is a counterweight 142 that balances the pivot arm so that the top brushes may be lowered to a dusting position as shown in FIG. 5 or pivoted upwardly to an open or pass-through position as seen in FIG. 6. The upper brushes 132 and 134 may be rotated upwardly or downwardly to best dedust different-sized boards or allow access to the inside of the deduster.

Figure 7:
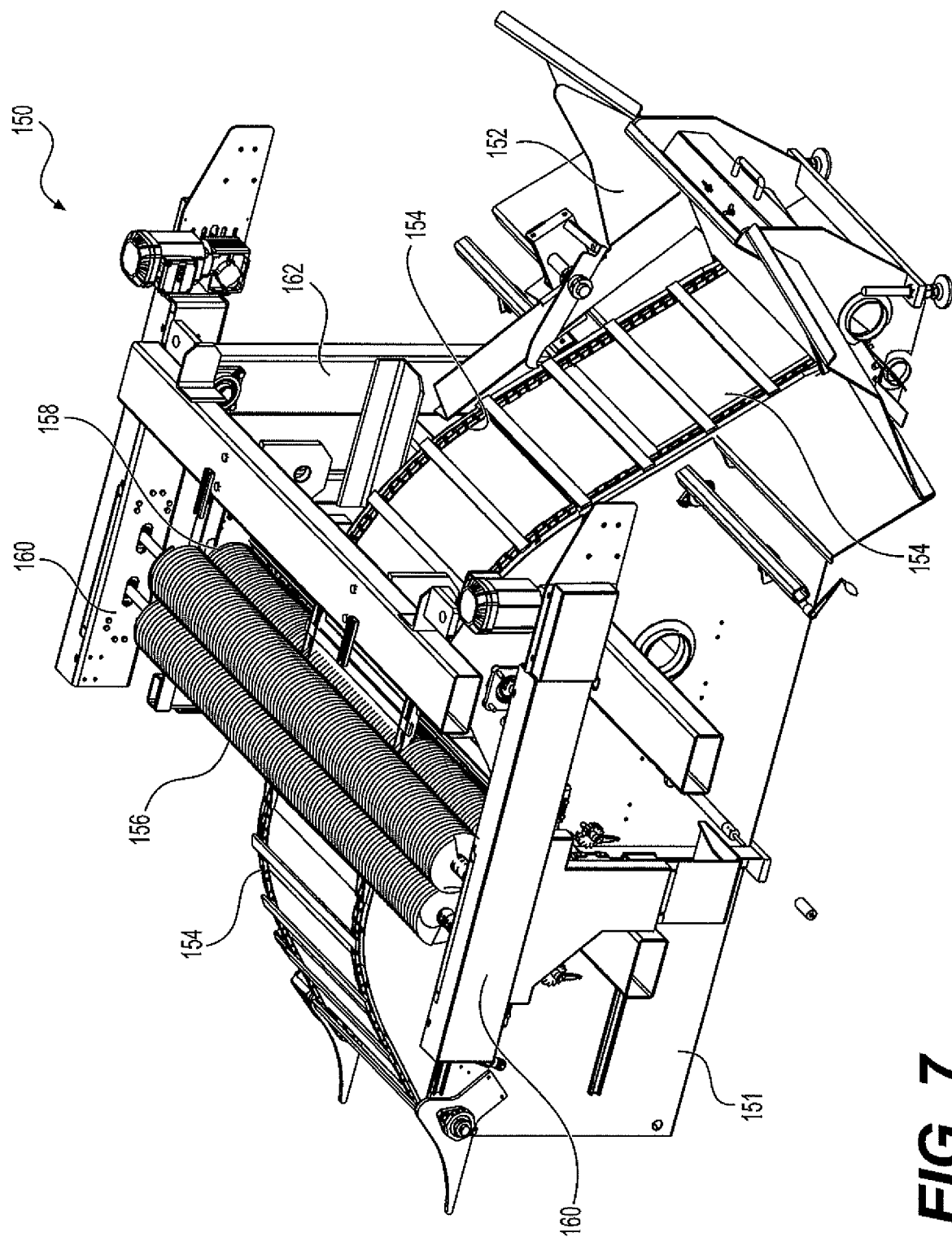
FIG. 7 is a perspective view of a deduster apparatus without dust collection ports.
Figure 8:
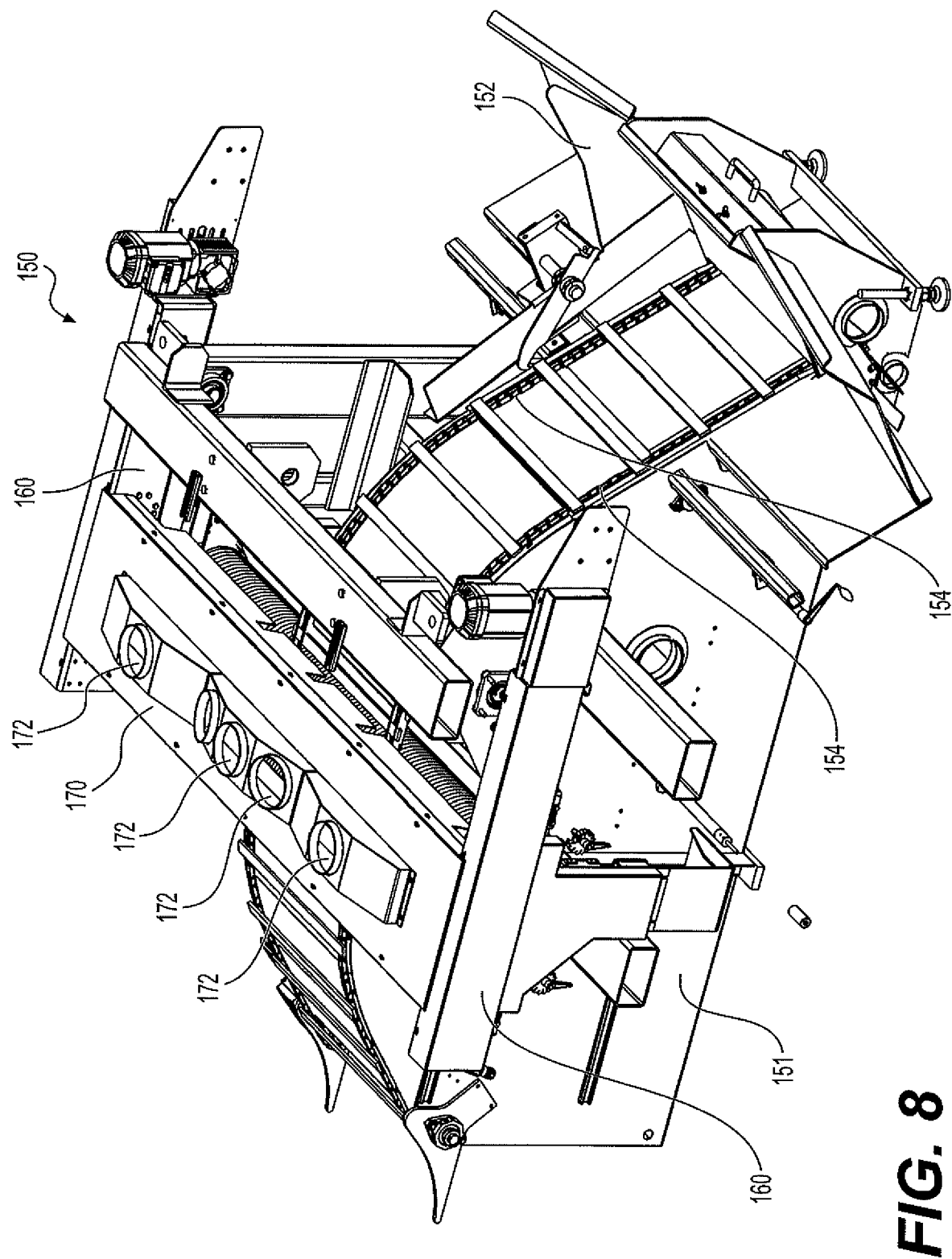
FIG. 8 is a top perspective view of a deduster apparatus with dust collection ports.
Figure 9:
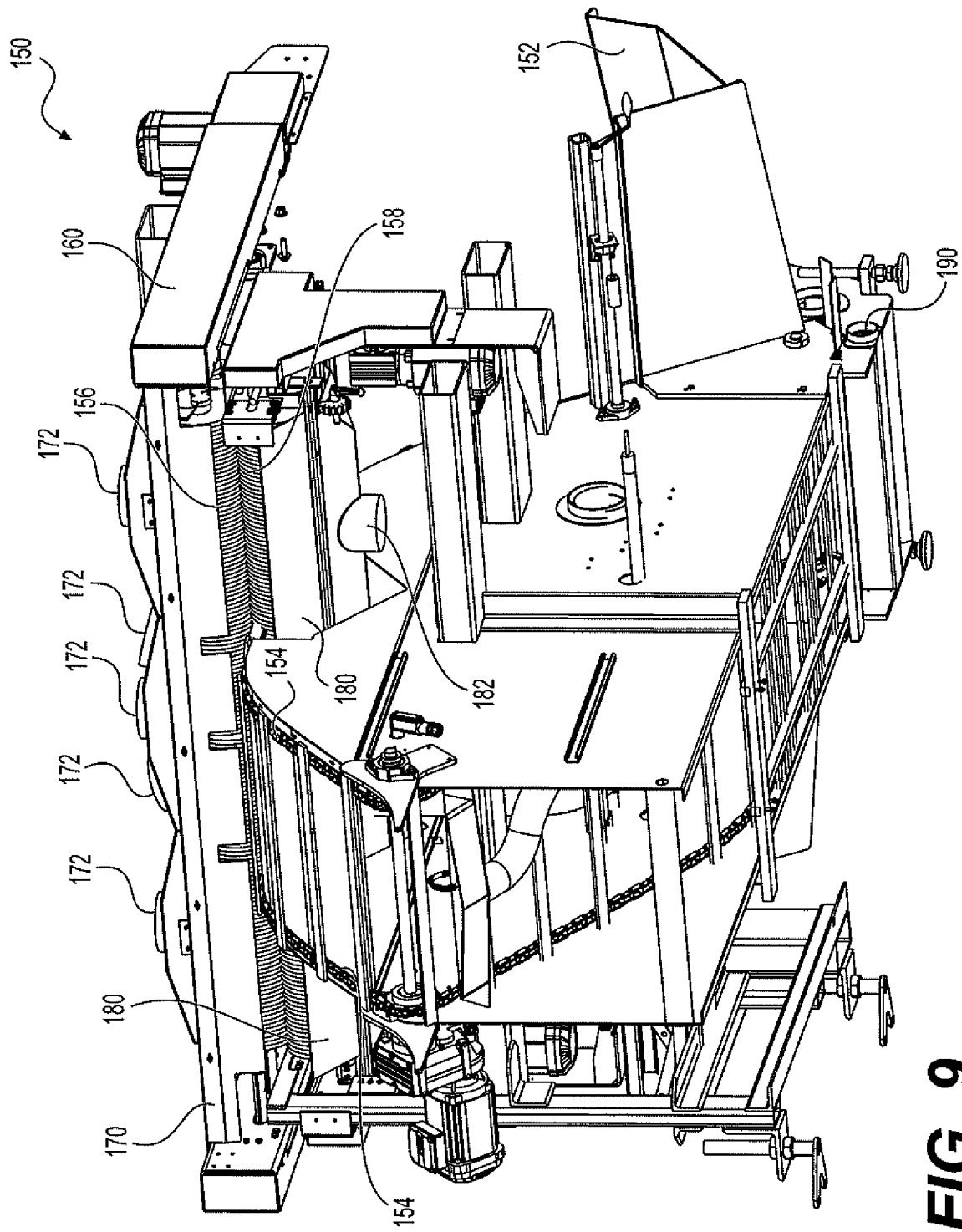
FIG. 9 is a bottom perspective view of a deduster apparatus with dust collection ports.

FIGS. 7-9 are perspective views of a deduster system 150 similar to that shown in FIGS. 5 and 6. FIGS. 7-9 illustrate clearly the pivot arm 160 and FIGS. 8-9 illustrate the vacuum system mounted around the rotating brushes. The process of the deduster system 150 begins with a hopper 152 which is where loose boards are placed to pass through the system. A conveyor 154 singulates the boards and carries them through the system 150. In FIG. 7, the top counter-rotating brushes 156 and bottom counter-rotating brushes dust off the boards that are fed along the conveyor 154. The brushes 156 are supported and carried on pivot arm 160 which can be raised and lowered as needed. Bottom brushes 158 are mounted and supported by the rigid system frame 151.

FIG. 8 is the same system 150 and perspective view as shown in FIG. 7, except that a shroud 170 and vacuum ports 172 are shown mounted on the pivot arm 160 and above the rotating brushes (not shown because they are under the shroud). Five vacuum ports are shown in FIG. 8. There could be more or fewer ports as needed for a particular application and depending on the size of the brushes and the size of the vacuum ports. Also, round ports 172 are shown, but other shapes may be used. These vacuum ports 172 are positioned directly above the middle of where the rotating brushes (156 in FIG. 7) are mounted so that any suction force or throwing of the dust and particles will be directed straight into the vacuum ports.

FIG. 9 is a different perspective view of the deduster system 150. There is shown the hopper 152 where boards are loaded. There is shown the back end of the conveyor 154 where dusted boards will emerge from between the brushes 156 and 158. The overhead shroud 170 and vacuum ports 172 can be seen mounted on the pivot arm 160 and above the brushes 156. In this FIG. 9, however, there is also shown a bottom shroud 180 on both sides of the conveyor 154 with the shroud having a vacuum port 182 on each side of the conveyor (the second bottom vacuum port 182 is blocked by the conveyor 154. As with the top vacuum ports 172, the bottom vacuum ports 182 can be any size or shape and there can be more or fewer of these bottom ports. The bottom vacuum ports 182 are positioned below the middle of the counter-rotating bottom brushes 158 so that any downward suction force or directing of dust or particles is sent directly into the vacuum ports 182. This FIG. 9 also shows a vacuum port 190 at the bottom of the hopper 152 to collect and take dust and particles off of boards as they are loaded into the hopper.

Figure 10A:
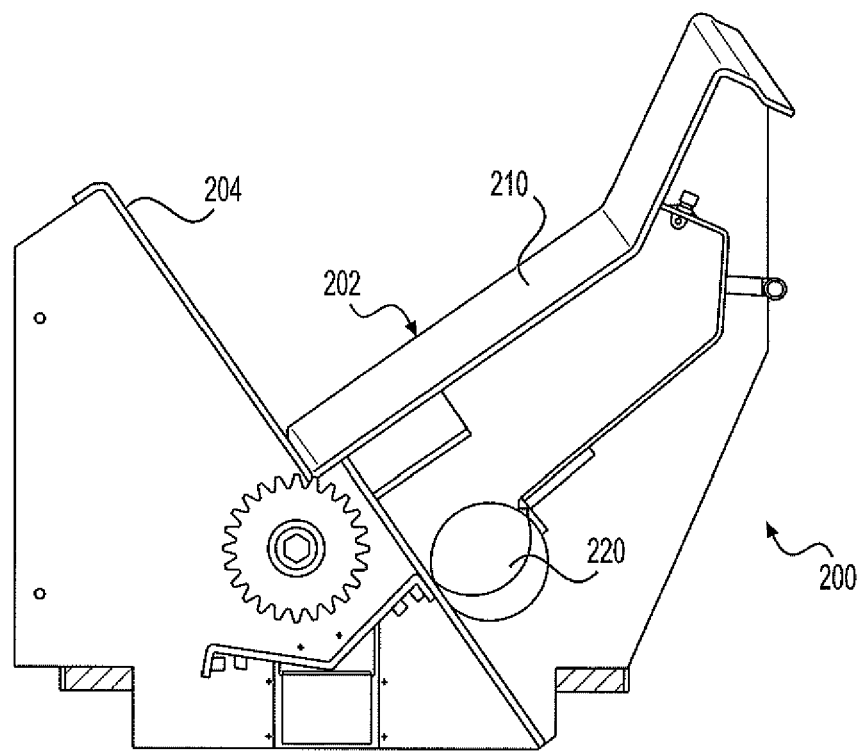
FIGS. 10A-B are section view and top views, respectively, of a deduster hopper.
Figure 10B:
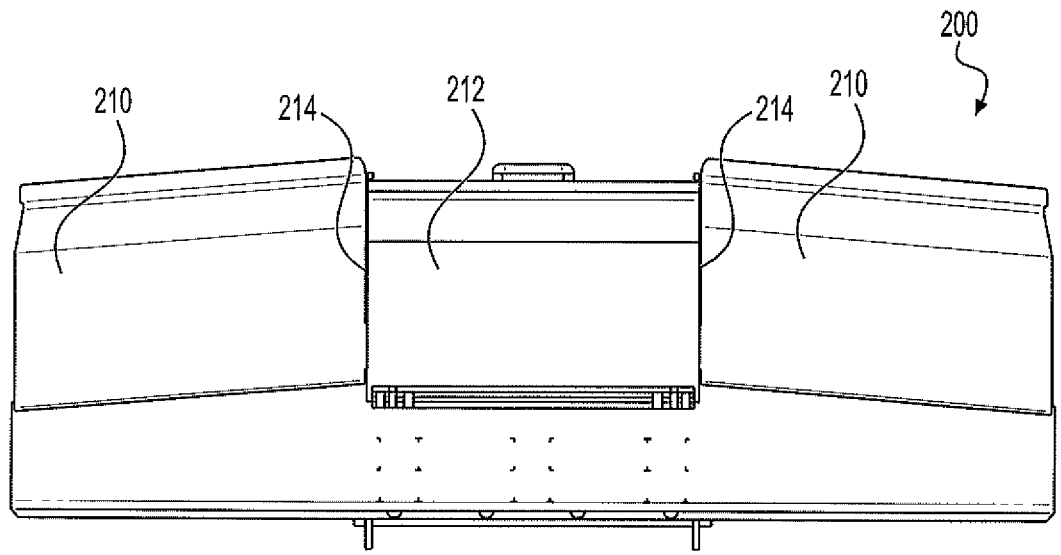

FIGS. 10A and 10B illustrate a deduster hopper 200. The hopper 200 includes a bowl 202 that is formed of sidewings 210 and a center boss 212 that provide a place to load undusted boards into a deduster machine as shown in earlier drawings. At the point of intersection of the sidewings 210 and the boss 212, there are open slits 214 that allow passage of sawdust and wood chips to fall under the hopper 200 bowl 202. A port 220 is open to the slits 214. A vacuum system is connected to the port 220 to suction away the wood chips and sawdust that falls to the bottom of the bowl 202 in order to remove those particles even before heading into the counter rotating brushes of the deduster later in the dedusting process.

Other embodiments of the present invention will be apparent to those skilled in the art from consideration of the specification. It is intended that the specification and figures be considered as exemplary only, with a true scope and spirit of the invention being indicated by the following claims.

It is claimed:

1. A board handling hopper for removal of dust from wood boards comprising
   at least two opposite support walls that form a V-shape comprising a first angled wall and second angled wall which first and second angled walls touch each other and that are adapted to receive and support wood boards in the hopper;
   at least one of the support walls being formed of a plurality of flat panels wherein the flat panels are positioned so that there is a gap between adjacent panels;
   a vacuum port in a plenum with direct connections to the gaps between the panels of the hopper support walls;
   whereby wood dust can be vacuumed from under wood boards that are deposited in the hopper for processing.

2. A board processing deduster system comprising
   (a) a board handling hopper for removal of dust from wood boards comprising at least two opposite support walls that form a V-shape comprising a first angled wall and second angled wall which first and second angled walls touch each other and that are adapted to receive and support wood boards in the hopper;

at least one of the support walls being formed of a plurality of flat panels wherein the flat panels are positioned so that there is a gap between adjacent panels;

a vacuum port in a plenum with direct connections to the gaps between the panels of the hopper support walls;

whereby wood dust can be vacuumed from under wood boards that are deposited in the hopper for processing; and (b) a wood board processing deduster.

3. The board processing dedusting system of claim 2, wherein the board processing deduster comprises a board conveyor comprising a static frame supporting a moving conveyor belt adapted to carry boards in a machine direction wherein a longest edge of a board is adapted to be positioned on the conveyor belt in a substantially perpendicular orientation to the machine direction;

wherein the board conveyor belt has a top side on which boards are adapted to be carried and a bottom side of the board conveyor belt;

two pairs of rotating brushes including a first pair of rotating brushes adjacent the top side of the board conveyor belt and a second pair of rotating brushes adjacent the bottom side of the board conveyor belt opposite the first pair of rotating brushes;

wherein the first pair of rotating brushes and the second pair of rotating brushes each rotate on an axis parallel to the longest edge of a board on the conveyor;

the first pair of rotating brushes counter rotate so that a leading edge of the first pair of rotating brushes that come in contact with a board on the board conveyor belt sweep toward each other and upwardly in the middle of the first pair of rotating brushes;

the second pair of rotating brushes counter rotate so that a leading edge of the second pair of rotating brushes that come in contact with a board on the board conveyor belt sweep toward each other and downwardly in the middle of the second pair of rotating brushes.

4. The board processing dedusting system of claim 3, wherein the first pair of rotating brushes each have a cross-sectional diameter, and the diameter of the two brushes is substantially the same.

5. The board processing dedusting system of claim 3, wherein the second pair of rotating brushes each have a cross-sectional diameter, and the diameter of the two brushes is substantially the same.

6. The board processing dedusting system of claim 3, wherein the first pair of rotating brushes and the second pair of rotating brushes are positioned substantially directly across from each other on opposite sides of the conveyor belt.

7. The board processing dedusting system of claim 3, further comprising a plurality of vacuum ports positioned around the board conveyor belt, and wherein at least one vacuum port is above the top side of the board conveyor belt and at least one vacuum port is below the bottom side of the board conveyor belt.

8. The board processing dedusting system of claim 3, further comprising a plurality of vacuum ports positioned around the board conveyor belt, and wherein the plurality of vacuum ports is above the top side of the board conveyor belt and the plurality of vacuum ports is below the bottom side of the board conveyor belt.

9. The board processing dedusting system of claim 3, further comprising a plurality of vacuum ports positioned around the two pairs of rotating brushes, and wherein the plurality of vacuum ports is above the top side of the pair of rotating brushes and the plurality of vacuum ports is below the bottom side of the pairs of rotating brushes.

10. The board processing dedusting system of claim 3, further comprising a plurality of vacuum ports positioned around the two pairs of rotating brushes and wherein the plurality of vacuum ports is centered above the intersection of the pair of the top rotating brushes and the plurality of vacuum ports is centered below the intersection of the pair of the bottom rotating brushes.

11. The board processing dedusting system of claim 3, further comprising a pivot arm connected to the frame, wherein the pivot arm is also connected to the first pair of rotating brushes, and the pivot arm is adapted to pivot up and down and make the first pair of rotating brushes of an adjustable height over the top side of the board conveyor belt.

* * * * *